United States Patent
Djuric et al.

(10) Patent No.: US 10,482,559 B2
(45) Date of Patent: Nov. 19, 2019

(54) PERSONALIZING RIDE EXPERIENCE BASED ON CONTEXTUAL RIDE USAGE DATA

(71) Applicant: UATC, LLC, San Francisco, CA (US)

(72) Inventors: Nemanja Djuric, Pittsburgh, PA (US); Vladan Radosavljevic, Pittsburgh, PA (US)

(73) Assignee: UATC, LLC, San Francisco, CA (US)

( * ) Notice: Subject to any disclaimer, the term of this patent is extended or adjusted under 35 U.S.C. 154(b) by 336 days.

(21) Appl. No.: 15/349,648

(22) Filed: Nov. 11, 2016

(65) Prior Publication Data
US 2018/0137593 A1    May 17, 2018

(51) Int. Cl.
G06Q 50/30 (2012.01)
G06Q 10/06 (2012.01)

(52) U.S. Cl.
CPC ..... *G06Q 50/30* (2013.01); *G06Q 10/063112* (2013.01)

(58) Field of Classification Search
None
See application file for complete search history.

(56) References Cited

U.S. PATENT DOCUMENTS

| | | |
|---|---|---|
| 3,899,928 A | 8/1975 | Fraiture |
| 3,932,858 A | 1/1976 | Smith |
| 3,941,203 A | 3/1976 | Leconte |
| 4,217,644 A | 8/1980 | Kato |
| 4,255,789 A | 3/1981 | Hartford |
| 4,325,336 A | 4/1982 | Kuno et al. |
| 4,408,290 A | 10/1983 | Kubo |
| 4,536,748 A | 8/1985 | Tonello |
| 4,810,953 A | 3/1989 | Huynh |
| 5,369,591 A | 11/1994 | Broxmeyer |
| 5,450,329 A | 9/1995 | Tanner |
| 5,469,371 A | 11/1995 | Bass |
| 5,682,100 A | 10/1997 | Rossi |
| 5,740,047 A | 4/1998 | Pilley |
| 5,812,427 A | 9/1998 | Nonoyama |
| 5,831,570 A | 11/1998 | Ammar |
| 5,907,293 A | 5/1999 | Tognazzini |
| 5,983,161 A | 11/1999 | Lemelson |
| 6,115,659 A | 9/2000 | Buchheim |
| 6,154,292 A | 11/2000 | Motoi |

(Continued)

OTHER PUBLICATIONS

Ford Motor Company, "SYNC" Owner's Guide Supplement, Sync System Version 1, Nov. 2007. (Year: 2007).*

(Continued)

*Primary Examiner* — Stephanie Z Delich
(74) *Attorney, Agent, or Firm* — Dority & Manning, PA

(57) ABSTRACT

A transport system can manage an on-demand transportation service to connect available vehicles with users, and can compile ride history data for each user. The ride history data can indicate the contextual usage of the on-demand transportation service by the user. Based on the ride history data, the transport system can determine demographic and personal interest information of the respective user. The transport system may then personalize one or more ride characteristics of any ride requested by the user based on the demographic and personal interest information determined from the ride history of the user.

20 Claims, 6 Drawing Sheets

(56) References Cited

U.S. PATENT DOCUMENTS

| | | |
|---|---|---|
| 6,360,171 B1 | 3/2002 | Miyamoto |
| 6,370,475 B1 | 4/2002 | Breed |
| 6,405,132 B1 | 6/2002 | Breed |
| 6,606,033 B1 | 8/2003 | Crocker |
| 6,611,755 B1 | 8/2003 | Coffee |
| 6,873,642 B1 | 3/2005 | Fey |
| 7,200,409 B1 | 4/2007 | Ichikawa |
| 7,295,925 B2 | 11/2007 | Breed |
| 7,333,725 B1 | 2/2008 | Frazier |
| 7,426,437 B2 | 9/2008 | Breed |
| 7,840,355 B2 | 11/2010 | Breed |
| 8,355,117 B2 | 1/2013 | Niclass |
| 8,849,494 B1 | 9/2014 | Herbach |
| 9,103,671 B1 | 8/2015 | Breed |
| 2002/0071509 A1 | 6/2002 | Richards |
| 2002/0181799 A1 | 12/2002 | Matsugu |
| 2003/0009275 A1 | 1/2003 | Koike |
| 2003/0061002 A1 | 3/2003 | Steinbrecher |
| 2003/0112133 A1 | 6/2003 | Webb |
| 2003/0218551 A1 | 11/2003 | Crocker |
| 2004/0101161 A1 | 5/2004 | Roh |
| 2004/0119633 A1 | 6/2004 | Oswald |
| 2004/0128062 A1 | 7/2004 | Ogino |
| 2004/0133390 A1 | 7/2004 | Osorio |
| 2004/0138809 A1 | 7/2004 | Mukaiyama |
| 2004/0249485 A1 | 12/2004 | Bondarev |
| 2005/0088318 A1 | 4/2005 | Liu |
| 2007/0030342 A1 | 2/2007 | Wilburn |
| 2007/0076652 A1 | 4/2007 | Nishiwaki |
| 2007/0244643 A1 | 10/2007 | Tengler |
| 2007/0276600 A1 | 11/2007 | King |
| 2007/0286471 A1 | 12/2007 | Kaneda |
| 2008/0040023 A1 | 2/2008 | Breed |
| 2008/0247735 A1 | 10/2008 | Kazanzides |
| 2009/0051396 A1 | 2/2009 | Shimamoto |
| 2010/0054282 A1 | 3/2010 | Schirmer |
| 2011/0002378 A1 | 1/2011 | Raveendran |
| 2011/0002379 A1 | 1/2011 | Raveendran |
| 2011/0002405 A1 | 1/2011 | Raveendran |
| 2011/0125063 A1 | 5/2011 | Shalon |
| 2012/0096942 A1 | 4/2012 | Hayashi |
| 2012/0265616 A1* | 10/2012 | Cao ................ G06Q 30/0261 |
| | | 705/14.58 |
| 2014/0156396 A1* | 6/2014 | deKozan ........... G06Q 30/0255 |
| | | 705/14.53 |
| 2014/0177932 A1 | 6/2014 | Milne |
| 2015/0204983 A1 | 7/2015 | Georgy |
| 2015/0248689 A1* | 9/2015 | Paul ................ G06Q 30/0222 |
| | | 705/14.23 |
| 2016/0103002 A1 | 4/2016 | Milota |
| 2016/0364678 A1* | 12/2016 | Cao ..................... G06Q 50/30 |
| 2017/0221086 A1* | 8/2017 | Zhou ............... G06Q 30/0211 |
| 2018/0054647 A1* | 2/2018 | Tulabandhula .. H04N 21/41422 |

OTHER PUBLICATIONS

Tom Luan, Lin Cai, Jiming Chen, Zuemin, Shen, Fan Bai. VTube: Towards the Media Rich City Life with Autonomous Vehicular Content Distribution. Department of Electrical and Computer Engineering, University of Waterloo, ON, Canada. (Year: 2014).*

Alok Nandan, Shirshanka Das, Biao Zhou, Giovanni Pau, Mario Gerla. AdTorrent: Digital Billboards for Vehicular Networks. Computer Science Department, UCLA, May 30, 2005. (Year: 2005).*

Geiger, Harley Lorenz. A Framework for Digital Signage Privacy. Policy Counsel, Center for Democracy and Technology. (Year: 2005).*

* cited by examiner

PERSONALIZING RIDE EXPERIENCE BASED ON CONTEXTUAL RIDE USAGE DATA

BACKGROUND

Content targeting has evolved significantly in terms of precision and ubiquity. For example, advertisers could perform a cursory analysis of a certain population to determine a general set of interests, and connect a product or service to those interests. Thus, a billboard advertisement at a sporting venue may involve snacks or beverages that sporting enthusiasts may typically enjoy while experiencing a match or game. Advertisers have also used applied psychology and behaviorism to construct advertisements that appeal to certain basic emotions of targeted consumers, such as love, hate, and fear. The extreme effectiveness of such techniques has led to pervasion of consumer advertising throughout nearly all cultures and societies in the world.

With the onset of the Internet, online advertising quickly evolved through a series of phases, such as early banner advertisements on websites, relentless pop-up advertisements over preferred content, pay-per-click revenue models, and eventually to more standardized HyperText Markup Language (HTML) constructs providing designated blocks for advertisement images, texts, animations, videos, and other content. Concurrently, app developers have utilized mobile advertising companies to insert advertisements through mobile device operating systems and web browsers. In addition, native or disguised advertising—which matches the form and function of the platform upon which it appears—has become more and more ubiquitous, purportedly offering a less intrusive user content browsing experience.

Browsers, search engines, and social media platforms continue to accumulate massive amounts of data for each user through browsing history, text parsing, associations with other users, and feedback information, in order to provide more narrowly targeted advertisements to users. These entities seek to determine user interests on an individualized and/or clustered level in order to provide narrowly targeted advertisements for those users. From a content-provider standpoint, advertisements have typically been used as a source of revenue and/or as an alternative revenue source to counter content subscriptions.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
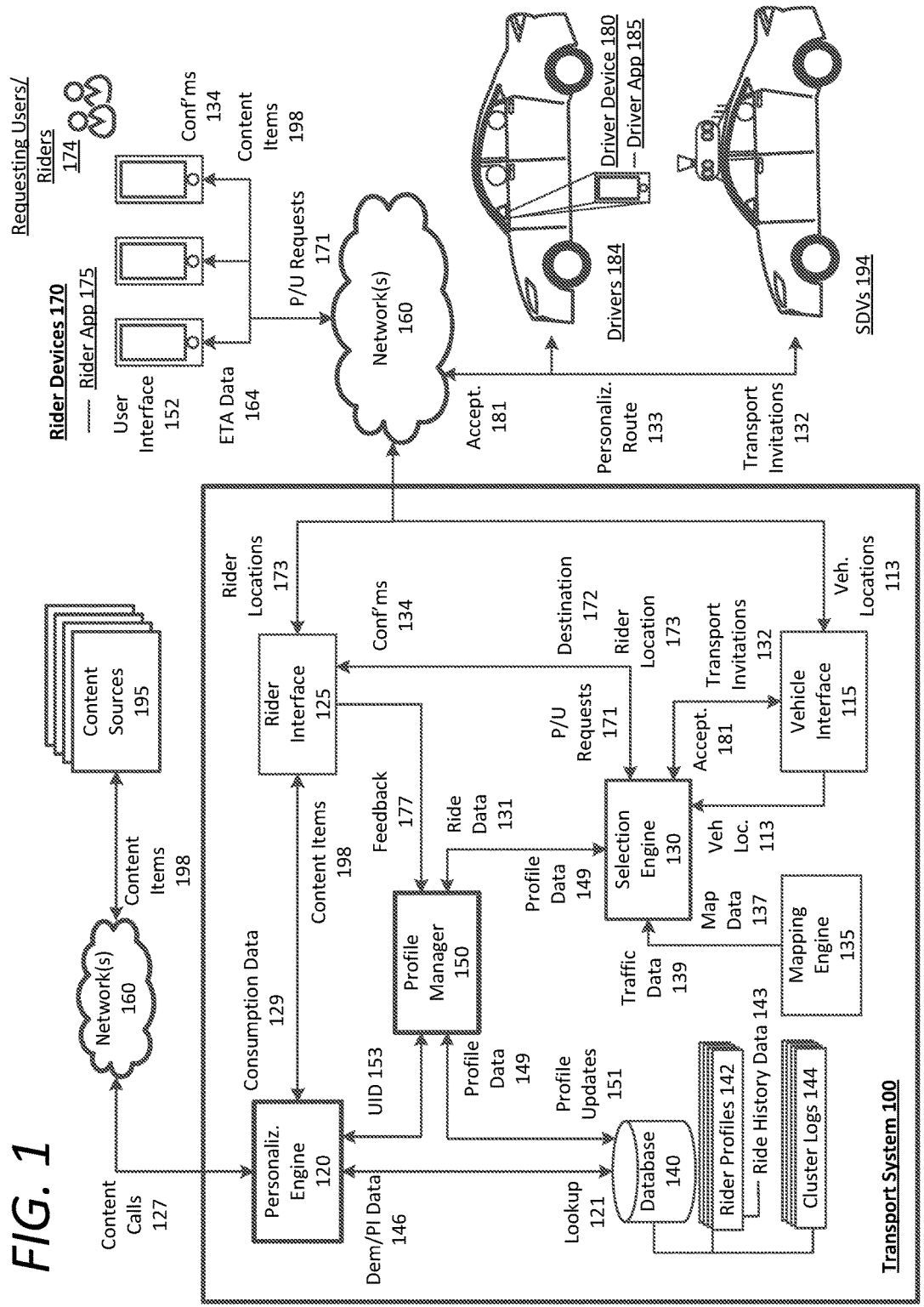
FIG. 1 is a block diagram illustrating an example transport facilitation system in communication with riders and vehicles, in accordance with examples described herein.

A transport facilitation system is discussed herein that manages an on-demand transportation arrangement service linking available drivers and/or autonomous vehicles (AVs) with requesting riders throughout a given region (e.g., a metroplex such as the San Francisco Bay Area). In doing so, the transport facilitation system (or "transport system") can receive user requests for transportation from requesting users via a designated rider application executing on the users' computing devices. Based on a determined or inputted pick-up location, the transport system can identify a number of proximate available vehicles and transmit a transport invitation to a driver device of the proximate available vehicles or to a communication interface of an AV to service the pick-up request.

In determining a most optimal driver or AV to service a given pick-up request, the transport system can identify a plurality of candidate drivers and/or AVs to service the pick-up request based on a pick-up location indicated in the pick-up request. As provided herein, an "optimal" driver or AV corresponds to a driver or AV, from a candidate set of vehicles, that has been determined to be most suitable to servicing a particular pick-up request based on one or more factors. The factor(s) can comprise the vehicle being closest to the pick-up location, having a lowest estimated time of arrival (ETA) to the pick-up location, an estimated collective value generated by the driver in being selected as compared to other drivers or AVs, and other factors. In some aspects, the transport system can identify a set of candidate vehicles (e.g., twenty or thirty vehicles within a certain proximity of the pick-up location), and select a most optimal vehicle (e.g., a closest vehicle to the pick-up location, a vehicle with the shortest estimated travel time from the pick-up location, a vehicle traveling to a location within a specified distance or specified travel time to the destination location, etc.) from the candidate vehicles to service the pick-up request based on any of the above factors. Example backend transport systems described herein can comprise a network-based transport management system that facilitates on-demand transportation arrangement services, such as those provided by Uber Technologies, Inc., of San Francisco, Calif.

According to examples described herein, a transport system can compile ride history data for each respective user of the on-demand transportation service, the ride history data can indicate contextual usage of the on-demand transportation service by the respective user. Based on the ride history data, the transport system can determine demographic and personal interest information of each user, and personalize a number of ride characteristics for requested rides based on the demographic and personal interest information of the user. In some aspects, the transport system can do so by providing personalized content to the user on a display screen of the available vehicle or a display screen of a user device of the respective user (e.g., a smart phone or tablet computing device).

The ride history data can comprise spatial and temporal data corresponding to the user's usage of the on-demand ride service, such as time of day usage, day of week usage, drop-off and pick-up location characteristics, selected ride service types, preferred vehicle types and characteristics, driver or service ratings information provided by the user, and the like. For example, destinations inputted by the user can correspond to interests in a variety of services, hobbies, products, activities, professions, brands, and the like. Time of day and/or day of week information can provide further context to determining the user's interests and characteristics, such as the user's profession or main hobbies. Likewise, user demographics, such as age, gender or sex, income level, whether the user is a parent, etc., can be determined based on the user's contextual usage of the on-demand ride service. Along these lines, the transport system can combine demographic data with the determined interests to bolster the user's ride experience when utilizing the on-demand transportation service.

In certain implementations, when the user/rider is on-trip to a destination, the transport system can provide personalized content for the user, either via on-board display screens in the vehicle, or via a display screen of the rider's computing device (e.g., through an executing rider application). The personalized content can comprise content corresponding to any number of personalized user accounts of the rider, such as news articles, social media content, gaming content, targeted advertising content, and the like. In further examples, the transport system can discount a cost of the ride based, at least in part, on the amount of consumed advertising content, and/or a level of interaction with the advertising content by the rider. As provided herein, the advertising content may be targeted for the rider based on the various information gleaned from the rider's contextual usage of the on-demand transportation service. In some aspects, the discounting of the ride can be calculated based on a direct correlation with the backend revenue generated from the rider's ad consumption.

In further aspects, the transport system can provide riders and drivers with designated applications, executable on rider and driver devices respectively, that enable riders to make transport requests and drivers to accept transport service invitations. In certain examples, the rider application can include a selectable feature enabling the rider to select from viewing advertising content or suppressing advertising content during the ride. As described herein, the advertising content can be provided to the rider via the rider application executing on the rider's device, or can be displayed on display screens in the passenger interior of the vehicle (e.g., accessible in the back seats of the driver's vehicle or a servicing self-driving vehicle). Along these lines, the transport system can monitor a level of interaction with the advertising content during the ride, and optionally discount the ride based on the monitored level of interaction with the advertising content. In addition, certain features of the rider's device can be utilized through the rider application in order to determine demographic information of the rider. For example, the transport system may access accelerometer data from the rider's device to construct a gait pattern of the rider as the rider walks. The gait pattern can indicate, for example, the height, weight, and body type of the rider.

In various implementations, the personal interests of the rider—as determined from the ride usage history—can further be utilized to determine preferred routes to a destination (e.g., a scenic route versus a direct route). In further implementations, the transport system can analyze the ride history data for the users in order to cluster the users of based on common demographics or common personal interests. For each specified cluster, the transport system can establish a set of interest parameters that provides each user in the specified cluster with ride experience characteristics (e.g., displayed content) specific to the cluster. For example, the set of interest parameters can specify content to be displayed to users in the specified cluster, one or more vehicle types to be selected for the users in the specified cluster (e.g., a standard vehicle, a luxury vehicle, a high capacity vehicle, a sport utility vehicle, a specific vehicle brand, or a self-driving vehicle), or a preferred ride service type to be selected for the users in the specified cluster (e.g., a car-pooling service, a standard ride-sharing service, a professional driver service, a black car service, a luxury ride service, a high capacity vehicle service, or a self-driving vehicle service). In one example, the transport system can execute a machine learning model to classify each user into one or more clusters and customize the plurality of ride characteristics of the ride based the set of parameters for each of the one or more clusters. Along these lines, the transport system can cluster the users, based on common demographics and/or common personal interests, by representing each of the users as a vector comprising a series of values indicative of each cluster in which the user is classified.

Among other benefits, the examples described herein achieve a technical effect of improving the ride experience of users of an on-demand transportation service. In doing so, the transport system disclosed herein can utilize contextual usage data of the transportation service in order to determine user information, such as demographic and personal interest information. In many respects, this information can be utilized in order to provide the user with personalized content (e.g., either via the user's computing device or interior displays of the matched vehicle, such as a self-driving vehicle). In one example, the transport system can monitor the user's interaction and/or consumption of the personalized content in order discount a cost of a serviced ride or provide a user credit for a future ride.

As used herein, a computing device refers to devices corresponding to desktop computers, cellular devices or smartphones, personal digital assistants (PDAs), laptop computers, tablet devices, virtual reality (VR) and/or augmented reality (AR) devices, wearable computing devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, virtual reality (VR) or augmented reality (AR) computers, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as those carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

As provided herein, the terms "autonomous vehicle" (AV) or "self-driving vehicle" (SDV) may be used interchangeably to describe any vehicle operating in a state of autonomous control with respect to acceleration, steering, and braking. Different levels of autonomy may exist with respect to AVs and SDVs. For example, some vehicles may enable autonomous control in limited scenarios, such as on highways. More advanced AVs and SDVs can operate in a variety of traffic environments without any human assistance. Accordingly, an "AV control system" can process sensor data from the AV or SDV's sensor array, and modulate acceleration, steering, and braking inputs to safely drive the AV or SDV along a given route.

System Description

FIG. 1 is a block diagram illustrating an example transport facilitation system in communication with user and driver devices, in accordance with examples described herein. The transport facilitation system 100 can manage a transportation arrangement service that connects requesting users or riders 174 with drivers 184 that are available to service the users' 174 pick-up requests 171. The transportation arrangement service can provide a platform that enables ride sharing services between requesting users 174 and available drivers 184 by way of a rider application 175 executing on the rider devices 170, and a driver application 185 executing on the driver devices 180. As used herein, a rider device 170 and a driver device 180 can comprise computing devices with functionality to execute a designated application corresponding to the on-demand transportation arrangement service managed by the transport facilitation system 100. In many examples, the rider device 170 and the driver device 180 can comprise mobile computing devices, such as smartphones, tablet computers, VR or AR headsets, on-board computing systems of vehicles, personal computers, laptops, wearable computing devices, and the like. Example transportation arrangement services implementing a ride sharing platform include those provided by UBER Technologies, Inc. of San Francisco, Calif.

In further examples, the transport system 100 can connect requesting users 174 with available self-driving vehicles ("SDVs'"") 194 operating throughout the given region. As such, when a requesting user 174 submits a pick-up request 171 via the executing rider application 175, the transport system 100 may select a proximate available SDV 194 to service the pick-up request 171. As provided herein, the SDV 194 and/or driver vehicle may include interior display screens (e.g., including touch-sensitive capabilities) that enable the requesting user 174 to perceive and interact with display content while the requesting user 174 is on-trip to a given destination 172.

The transport system 100 can include a rider interface 125 to communicate with rider devices 170 over one or more networks 160 via the rider application 175. According to examples, a requesting user 174 wishing to utilize the transportation arrangement service can launch the rider application 175 and transmit a pick-up request 171 over the network 160 to the transport system 100. In certain implementations, the requesting rider 174 can view multiple different service types managed by the transport system 100, such as ride-pooling, a standard ride share service type, a luxury vehicle service type, a high-capacity van or large vehicle service type, a professional driver service (e.g., where the driver is certified), a self-driving vehicle transport service, other specialized ride services, and the like. In some examples, the transport system 100 can utilize the vehicle locations 113 (e.g., via a GPS module of the driver device 180 or the SDV 194) to provide the rider devices 170 with ETA data 164 of proximate drivers 184 and SDVs 194 for each respective service type. For example, the rider application 175 can include a service type selection filter that enables the user 174 to view information corresponding to each respective service type, such as ETA data 164 for a selected service type.

In some examples, the pick-up request 171 can include a pick-up location within a given region (e.g., a metropolitan area managed by one or more datacenters corresponding to the transport system 100) in which a matched driver 184 or SDV 194 is to rendezvous with the requesting user 174. The pick-up location can be inputted by the user by setting a location pin on a user interface of the rider app 175, or can be determined by a current location 173 of the requesting user 174 (e.g., utilizing location-based resources of the rider device 170). Additionally, the requesting user 174 can further input a destination 172 during or after submitting the pick-up request 171.

According to examples described herein, the user interface 152 of the rider application 175 can query the rider 174 for a destination, or otherwise provide input features on the user interface 152 to receive data indicating a desired destination location 172. The user interface 152 can also enable the requesting user 174 to indicate a preferred ride service type and/or any specialized requests for the ride. As provided herein, the ride service types can comprise one or more carpooling service types, a standard ride-sharing service type (e.g., a normal car and operator), premium ride-sharing service types (e.g., black car, luxury vehicle, high capacity, luxury high-capacity, professional driver services), self-driving vehicle services, and can further include any number of specialized service request features, such as disability vehicle features and/or assistance, baby or toddler seat, bike rack, pick-up truck, roof racks, audio and/or video configurations, Wi-Fi access requests, and the like.

In accordance with some examples, the transport system 100 can include a database 140 storing rider profiles 142, driver profiles, and SDV profiles (not shown). The driver profile for a particular driver can include identifying information, such as vehicle information (e.g., vehicle model, year, license plate number, and color), the driver's overall rating, qualified service types (e.g., professional driver, certified assistance driver, etc.), experience, earnings, and the like. In variations, the driver profile can further include the driver's preferences, such as preferred service areas, routes, hours of operation, and the like. Likewise, an SDV profile can indicate the vehicle type, capacity, model and year, mileage, current power or fuel level, and the like. As such the driver and/or SDV profiles may be dynamically updated through location and data pings from the driver device 180 and/or SDV 194.

In various implementations, the transport system 100 can include a selection engine 130 to process the pick-up requests 171 in order to ultimately select from a pool of drivers 184 and/or self-driving vehicles 194 operating throughout the given region to service the pick-up requests 171. The transport system 100 can include a vehicle interface 115 to communicate with the SDVs 194 and the driver devices 180. In accordance with various examples, the driver devices 180 and SDVs 194 can transmit their current locations 113 using location-based resources (e.g., GPS resources). These vehicle locations 113 can be utilized by the selection engine 130 to identify a set of candidate drivers and/or SDVs (e.g., a set of twenty or thirty closest vehicles)—in relation to the pick-up location—that can service the pick-up request 171. The selection engine 130 can select a most optimal driver 184 or SDV 194 from the candidate set based on any number of factors. For example, the selection engine 130 can select a driver 184 or SDV 194 based on a shortest distance or time to the pick-up location.

Additionally or alternatively, the selection engine 130 can select a driver or SDV 194 based on ride service supply in highly localized areas. For example, the selection engine 130 may identify that an available vehicle is operating in a local area that is short of transportation supply, and may thus select an alternative vehicle to service the pick-up request 171. In such examples, the selection engine 130 can utilize a mapping engine 135 providing map data 137 and/or traffic data 139 to determine the route distance and/or route time of any given driver 184 or SDV 194 in a candidate set to travel to the pick-up location. In certain implementations, the selection engine 130 can further utilize profile data 149 from the requesting user's 174 rider profile 142 in order to ultimately match the requesting user 174 with an available driver 184 or SDV 194. As provided herein, the profile data 149 from the requesting user's 174 rider profile 142 can indicate the requesting user's 174 preferences and personal interests. Accordingly, in some examples, the selection engine 130 can further reference driver and/or vehicle profiles in the database 140 in order to match the requesting user 174 with a driver 184 or SDV 194 that can accommodate the preferences and personal interests indicated in the profile data 149 of the requesting user 174.

According to various implementations, the selection engine 130 can perform an optimization over a set of factors in order to match the requesting user 174 with an available driver 184 or SDV 194. These factors can be weighted in a predetermined manner geared towards, for example, maximizing rider satisfaction. In some aspects, more heavily weighted factors can comprise wait time for the requesting user 174, or ETA to the pick-up location, based on the map data 137 and traffic data 139. The optimization factors can further include localized transportation supply and other high level valuation metrics that maximize the overall value of the on-demand transportation service for the given region. Still further, as described herein, the optimization factors can further include factors corresponding to the demographics, personal interests, and/or preferences of the requesting user 174 as determined from ride history data 143 in the user's 174 rider profile 142.

Once an optimal driver 184 is selected, the selection engine 130 can generate a transport invitation 132 to service the pick-up request 171, and transmit the transport invitation 132 to the optimal driver 184 via the driver application 185 executing on the optimal driver's computing device 180. Upon receiving the transport invitation 132, the optimal driver 189 can either accept or reject the invitation 132. Rejection of the invitation 132 can cause the selection engine 130 to determine another optimal driver from the candidate set of drivers 184 to service the pick-up request 171, or can cause the selection engine 130 to determine a new set of candidate drivers from which to select another driver. If the optimal driver 189 accepts (e.g., via an acceptance input), then the acceptance input 181 can be transmitted back to the selection engine 130, which can generate and transmit a confirmation 134 of the optimal driver 189 to the requesting user 174 via the rider application 175 executing on the requesting user's 174 computing device 170. If the optimal vehicle is an SDV 194, the selection engine can transmit the transport invitation 132 or an instruction to a communications interface of the SDV 194. In some aspects, the invitation 132 or instruction can include route information that instructs the SDV 194 to autonomously drive to the pick-up location in order to rendezvous with the requesting user 174.

In various examples, the transport system can include a profile manager 150 to compile and analyze ride history data 143 for each user 174 of the on-demand transportation service. The ride history data 143 can indicate contextual usage of the on-demand transportation service by the requesting user 174. The contextual usage can correspond to pick-up and drop-off locations, alternate and/or preferred routes, time-of day and/or day of week usage, a rate of usage (e.g., average times per month or week), ride service type usage, special vehicle and/or driver requests, and the like. As an example, the profile manager 150 of the transport system 100 can analyze the ride history data 143 in each rider profile 142 to determine the personal preferences and interests of the rider 174. In addition, the profile manager 150 can analyze the ride history data 143 in the rider profile 142 to determine the demographics of the rider 174, such as the rider's age, gender, income level, and the like. The profile manager 150 may then combine the rider's demographics and personal interests—as determined from the rider history data 143—to personalize and improve the ride experience of the rider 174 for future rides.

In various implementations, the profile manager 150 can analyze the contextual usage of the on-demand transport service to classify the rider's characteristics and interests. In some aspects, the profile manager 150 can implement unsupervised data analysis (e.g., via execution of a set of machine learning algorithms) in order to infer the rider's characteristics, such as the rider's demographics, preferences, and personal interests. As an example, a daily commuter that utilizes the luxury ride service type of the on-demand transportation service for commutes to and from work in normal working hours on weekdays can be classified as a relatively affluent working professional. The drop-off location of the rider 174 can further indicate the profession of the rider 174. For example, if the rider 174 utilizing the luxury ride service is routinely dropped off at a hospital, the profile manager 150 can classify the rider 174 as a doctor. Furthermore, the drop-off times and specific drop-off locations around a hospital (e.g., in certain wings of the hospital, such as a cancer wing, intensive care section, emergency room entrance, family care section, pediatrics section, etc.) can indicate the type of doctor and thus the likely interests of that doctor when utilizing previously analyzed mass data to determine the doctor's personal interests.

As another example, the profile manager 150 can determine—from the ride history data 143 of the rider 174—whether the rider 174 is likely a parent, and may further determine a relative age of the rider's child or children. In some examples, the profile manager 150 may further identify whether the rider is likely a single working parent. For example, a rider 174 that routinely inputs a drop-off location proximate to a day care center or school before proceeding to a professional building, such as a corporate headquarters, business complex, university, etc., can be readily identified as a single working parent. As described herein, the age and gender or sex of the rider 174 can further be determined through analysis of the ride history data 143. As an example, if the rider 174 occasionally utilizes the on-demand transportation service to go to night club districts at nighttime hours, the profile manager 150 can determine that the rider 174 is relatively young. Conversely, the profile manager 150 can determine that the rider 174 is relatively elderly if the pick-up location of an occasional rider 174 is typically in front of a retirement home. Drop-off locations can also be indicators of the rider's demographics. For example, a monthly drop off at a cosmetology salon can indicate a female rider, whereas a monthly drop-off at a barber shop can indicate a male rider. Such demographic information may be utilized by the personalization engine 120 to personalize the ride experience of the rider 174. In certain aspects, the personalization engine 120 can do so by providing highly targeted advertising to the rider 174 while the rider 174 is on-trip. As described herein, the rider's consumption of this advertising can cause the ride fare to be discounted in accordance with a discounting calculation.

In various examples, the profile manager 150 can manage cluster logs 144 by clustering the requesting users 174 based on like personal interests and/or demographics. In some aspects, the profile manager 150 can represent each rider 174 as a sequence of symbols (e.g., characters and/or numbers) or as a vector, where each symbol represents a common characteristic of the rider 174 (e.g., a demographic characteristic or a personal interest characteristic). Accordingly, the profile manager 150 can classify the cluster logs 144 in terms of common characteristics in order to more readily provide a personalized ride experience for the rider 174. As an example, the cluster logs 144 can be referenced by a personalization engine 120 of the transport system 120 in order to provide personalized content or ride experience services to the rider 174 (e.g., reading material, video content, audio content, advertising content, gaming content and/or services, and the like). As such, the profile manager 150 can attribute each rider 174 with a unique identifier and/or account number, which can be utilized by the personalization engine 120 to reference the cluster logs 144 when the rider 174 makes a pick-up request 171.

In some examples, after each ride, feedback information 177 can be provided by the user 174, such as ratings, comments, and complaints, which can be utilized by the profile manager 150 in maintaining and updating the requesting user's 174 rider profile 142. Accordingly, when the requesting user 174 submits a pick-up request 171 and is matched with an available driver 184 or SDV 194 by the selection engine 130, the profile manager 150 can receive ride data 131 indicating the match, routing information from the pick-up location to the destination 172, and any ride updates or specialized requests made by the requesting user 174 (e.g., a baby seat, a bike rack, roof racks, audio and/or video requests, etc.). The profile engine 150 can utilize the ride data 131 to provide profile updates 151 to the requesting user's 174 rider profile 142, or generally include the ride data 131 with the requesting user's 174 ride history data 143.

Additionally, the profile manager 150 can provide a unique identifier 153 of the requesting user 174 to the personalization engine 120. In some examples, the personalization engine 120 can utilize the unique identifier 153 of the requesting user 174 to perform one or more lookups 121 in the database 140 for information indicating the requesting user's 174 demographics and/or personal interests and preferences. In various examples, the personalization engine 120 can utilize the unique identifier 153 to perform lookups 121 in the cluster logs 144 to identify the classifications of the requesting user 174. These classifications can indicate the demographics and interests that the requesting user 174 has in common with other clustered users. In variations, the personalization engine 120 can perform a lookup 121 in the requesting user's 174 rider profile 142 to identify the rider's demographics and personal interest information on an individual basis.

According to examples described herein, the personalization engine 120 can retrieve the demographics and/or personal interest data 146 of the requesting user 174 in order to provide a personalized ride experience for the user 174. In some aspects, personalization of the ride experience can entail providing on-board services, such as video conferencing or phoning services, content access (e.g., news or other informational articles or videos), and/or entertainment access (e.g., television or movie content, gaming access, etc.). In various examples, the personalization engine 120 can utilize the demographics and/or personal interest data 146 as a filter to provide on such ride services, features, and content in which the requesting user 174 is most likely to be interested. Thus, if the demographics and/or personal interest data 146 indicates that the requesting user 174 would most likely have no interest in content geared towards children, then the personalization engine 120 can exclude and children's content from the content and service options (e.g., video games, cartoon shows, children's story books, etc.).

In various implementations, the personalization engine 120 can utilize the demographics and/or personal interest data 146 of the requesting user 174 to target personalized content for the user 174. In such implementations, the personalization engine 120 can access a number of content sources 195, either locally or over one or more networks 160, to select content items 198 to provide to the user 174 while the user is on-trip to the destination 172. In some aspects, the user representation as a vector or sequence of numbers or symbols can be directly correlated to the clusters to which the user 174 belongs. Each cluster can be indicative of a set of targeted advertisements, and can be foundationally based on the demographics and personal interests of the users in the cluster. Accordingly, the cluster logs 144 can be referenced by the personalization engine 120 based on the unique identifier 153 of the requesting user 174. Based on the clusters associated with the requesting user 174, the personalization engine 120 can generate content calls 127 to the content sources 195 to receive a set of highly targeted content items 198 for the requesting user 174. These content items 198 can comprise advertising videos, images, text, interactive features, clickable or selectable links to additional content, and the like.

According to various examples, the personalization engine 120 can perform the lookups 121 and retrieve the targeted content items 198 while the selected vehicle is en route to rendezvous with the requesting user 174 at the pick-up location. In some aspects, the content items 198 can be provided to the requesting user 174 via the executing rider application 175 on the rider device 170 of the requesting user 174 (e.g., prior to pick-up and while on-trip). Additionally or alternatively, the content items 198 can be provided to the requesting user 174 via interior display screens within the matched vehicle (e.g., the optimal driver's vehicle or the matched SDV 194). Thus, in addition to receiving the unique identifier 153 of the requesting user 174, the personalization engine 120 can further receive identifying information of the matched vehicle in order to push or otherwise transmit the targeted content items 198 to the matched vehicle to be displayed to the requesting user 174 upon entering the vehicle and/or while the vehicle is on-trip to the destination 172.

As provided herein, the targeted content items 198 can be directly targeted based on the determined interests of the requesting user 174 as indicated in the user's ride history data 143. These data 143 can indicate various interests of the user 174, such as shopping or product interests, an interest in certain sports or sport teams, music interests, and the like. The personalization engine 120 can utilize the demographic and/or personal interest data 146 of the requesting user to provide targeted content items 198 to the user 174. As described in further detail with respect to FIG. 2 below, the personalization engine 120 can further monitor consumption data 129—corresponding to the user's interaction with or intake of the content items 198—in order to, for example, calculate a value of the consumed content. In some aspects, this value can be utilized by the transport system 100 as an added revenue source from advertisers, as a discount metric for the cost of the ride to the user 174, or a combination of both.

According to certain variations, the selection of the driver 184, SDV 194 or vehicle type, specialized features, audio or video settings in the vehicle, and any specialized features of the vehicle can also be made by the selection engine 130 based on the demographics and/or personal interest data 146. For example, when receiving a pick-up request 171, the selection engine 130 can receive profile data 149 of the requesting user 174 from the profile manager 150 that indicates the requesting user's personal preferences or needs. For example, the profile data 149 can indicate that the requesting user 174 has a disability and requires that the matched vehicle have certain specialized features, such as a wheelchair lift. As another example, the profile data 149 can indicate that the requesting user 174 usually requires a bike rack or a baby seat. In such examples, without receiving a definitive request for such features, the selection engine 130 can prioritize vehicles that include these specialized features when making an optimal selection.

In further examples, the profile data 149 and/or the demographics and personal interest data 146 can indicate route preferences of the requesting user 174. For example, over time, the transport system 100 can collect data indicating that the rides consumed by the user 174 have resulted in detours or alternative routes, which can indicate that the user prefers to avoid certain traffic areas or neighborhoods. In variations, these detours or alternatives can indicate that the user 174 prefers scenic routes as opposed to more centralized routes through dreary cityscapes or crowded freeways. In any case, the profile manager 150 can identify, in the ride history data 143, the user's preferences in relation to route characteristics. In additional to submitting a transport invitation 132 to a matched driver 184 or SDV 194, the selection engine 130 can further provide a personalized route 133 for the requesting user 174 indicating a preferred route to the destination 172 as opposed to the most temporally or spatially optimized route. In such examples, the selection engine 130 may provide a confirmation screen 134 to the requesting user 174 indicating that the personalized route 133 will be taken, and can enable the user 174 to accept or reject the route option.

Further description of the personalization engine 120 and other features of the transport system 100 is provided below with respect to FIG. 2.

Figure 2:
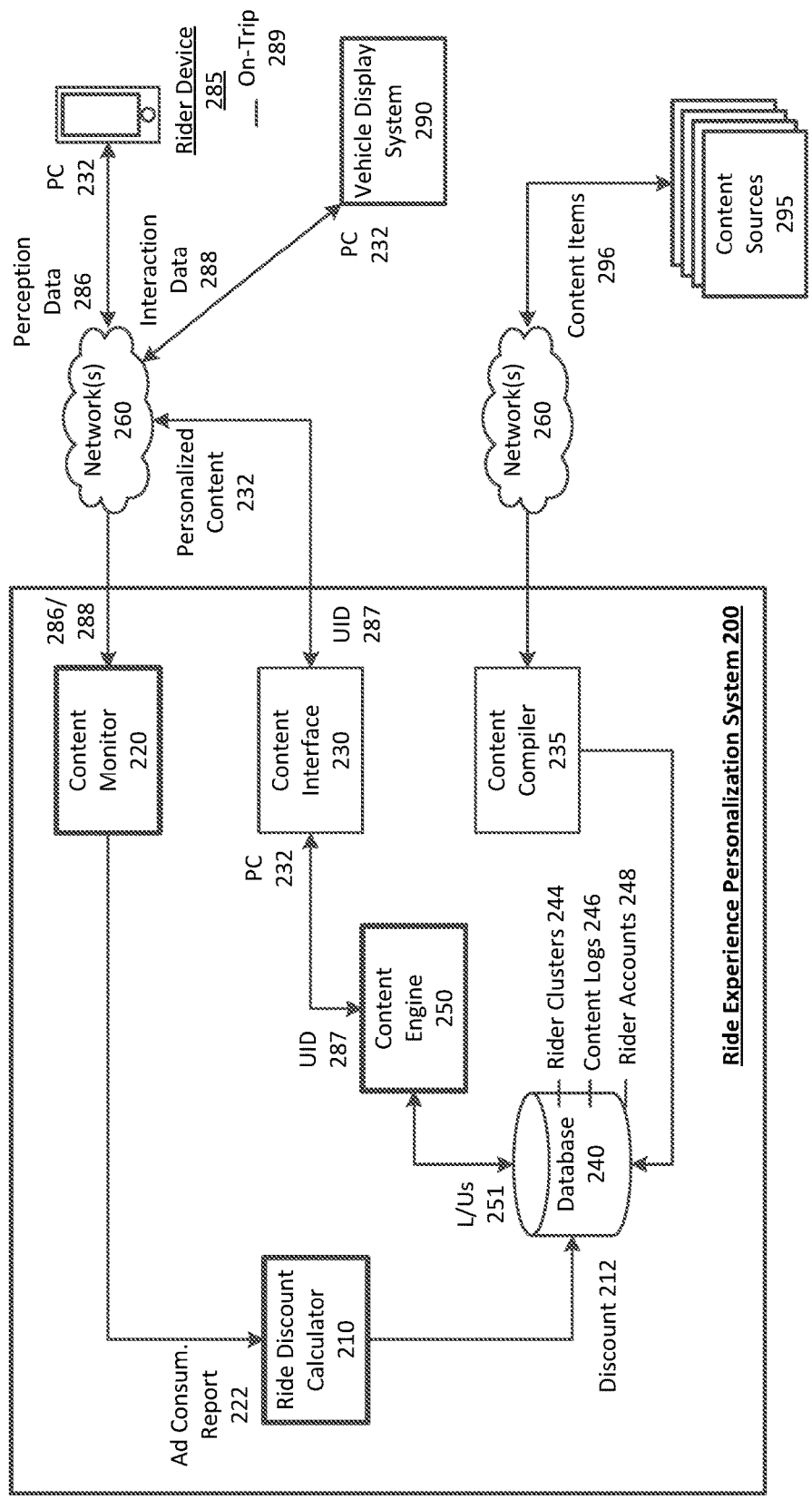
FIG. 2 is a block diagram illustrating an example ride experience personalization system, according to examples described herein.

FIG. 2 is a block diagram illustrating an example ride experience personalization system, according to examples described herein. Various examples of the ride experience personalization system 200 of FIG. 2 can comprise one or more components and include functionality described in connection with the personalization engine 120 of the transport system 100 of FIG. 1. Accordingly, the ride experience personalization system 200 as shown and described with respect to FIG. 2 may be included as a component of the backend transport system 100 of FIG. 1, or may be a separate and independent component or service with respect to the transport system 100. Accordingly, in certain implementations, the ride experience personalization system 200 shown in FIG. 2 may be in direct communications with certain components and logical blocks as shown and described with respect to FIG. 1. Furthermore, in the below description of FIG. 2, reference may be made to reference characters representing like features as shown and described with respect to FIG. 1.

Referring to FIG. 2, the ride experience personalization system 200 can include a database 240 comprising content logs 246 that include various content items 296 from content sources 295. For example, the business entity corresponding to the transport system 100 may be partnered with certain advertisers or advertising intermediaries to provide targeted content to users 174 of the on-demand transportation service. In forming such relationships, the content sources 295 can produce the content items 296 and can provide the content items 296 to a content compiler 235 of the ride experience personalization system 200. The content compiler 235 can classify each content item 296 for certain target audiences in accordance with various targeting parameters known in the pertinent art.

In certain implementations, the content compiler 235 receive keywords or other content classifiers with the individual content items 296 from the content courses 295, and can store the content items 296 in content logs 246 in the database 240. As provided herein, the content logs 246 can be correlated to rider clusters 244 comprised of targeted riders 174 with common or similar personal interests and/or demographic characteristics. Each rider 174 may be associated with any number of rider clusters 244 based on the determined demographics and personal interests of the rider 174. Each rider cluster 244 can be associated with targeting criteria which a content engine 250 of the ride experience personalization system 200 can utilize to provide targeted, personalized content 232 to individual riders 174 based on the rider clusters 244 to which the rider 174 belongs.

According to examples, when the rider 174 transmits a pick-up request 171 to the transport system 100, a content interface 230 of the ride experience personalization system 200 can receive a unique identifier 287 of the requesting rider 174. For example, the unique identifier 287 may be received from a rider interface 125 of the transport system 100, and/or may be included with the pick-up request 171. As provided herein, the unique identifier 287 can be utilized by the content engine 250 to reference the rider clusters 244 to which the requesting rider 174 belongs. In some aspects, the unique identifier 287 can comprise a vector or character sequence that directly indicates the classifications of the rider 174, or the rider clusters 244 to which the rider 174 belongs. Accordingly, the content engine 250 can perform lookups 251 in the content logs 246 for targeted content items 296 based on the rider clusters 244 associated with the requesting rider 174.

In some examples, the content engine 250 can retrieve the personalized content 232 from the content logs 246, and cause the personalized content 232 to be presented to the rider 174 on a display the rider device 285 (e.g., via the executing rider application 175 and over the network(s) 260). Additionally or alternatively, the content engine 250 can provide the personalized content 232 to the rider device 285 when the rider application 175 is in an "on-trip" mode 289, corresponding to the rider 174 being transported by the matched driver 184 or SDV 194 from the pick-up location to the destination 172. Thus, an indication of the on-trip mode 289 of the rider device 285 can trigger the content engine 250 to begin providing the personalized content 232. In variations, the content engine 250 can also provide the personalized content 232 to the rider device 285 while the rider 174 is awaiting pick-up, or when the matched vehicle is en route to the pick-up location to rendezvous with the rider 174. In still further variations, the content engine 250 can provide the content to the rider device 285 whenever the rider application 175 is executing. In such variations, the personalized content 232 may be displayed on the display screen of the rider device 285 in discreet areas or as native advertisements within the functional content of the rider application 175.

The foregoing display methods and triggers described with respect to the rider device 285 may alternatively be implemented on a vehicle display system 290 of the matched vehicle. Accordingly, the content engine 250 can provide the personalized content 232 to the matched vehicle over the one or more networks 260 to be displayed on the vehicle display system 290 while the matched vehicle transports the rider 174 to the destination 172. In one example, the on-trip status 289 of the rider application 175 can trigger the content engine 250 to push or otherwise transmit content data to the vehicle display system 290 of the matched vehicle, which can cause the personalized content 232 to be displayed when the rider 174 enters the vehicle, and while the rider 174 is being transported. The content engine 250 can receive identifying information of the matched vehicle, correlate the unique identifier 287 of the rider 174 with the matched vehicle, retrieve the personalized content 232 for the rider 174 from the content logs 246, and transmit the personalized content 232 to the matched vehicle to be displayed on the vehicle's display system 290 for the rider 174.

As described herein, the personalized content 232 can comprise any content specifically selected for the rider 174 based at least in part on the ride history data 143 of the rider 174. In further implementations, the personalized content 232 can be further selected based on third party data, such as the rider's content browsing history on a search engine, or direct interest data from the rider's interactivity with certain social media platforms (e.g., "like" information from the rider's FACEBOOK profile). Thus, the rider 174 can further be associated with certain rider clusters 244 based on a combination of the rider's ride history data 143 and third party information that further indicates the rider's personal interests, preferences, and demographics.

The personalized content 232 can include interactive content, such as interactive gaming applications, scrollable articles, video content (e.g., a news or entertainment program), or widgets linking the rider application 175 to third party applications of partnered entities (e.g., a social media application or content browsing application). The personalized content 232 may also include targeted advertising content, which can be interactive, passively viewed, clicked or selected to present additional content, and the like.

In certain examples, the ride experience personalization system 200 can include a content monitor 220 that can receive perception data 286 and/or interaction data 288 corresponding to the rider's viewing and/or interaction with the personalized content 232. In some aspects, the content monitor 220 can track the rider's advertising consumption over the course of a ride. Additionally or alternatively, the content monitor 220 can track the rider's advertising consumption whenever the rider application 175 is executing on the rider device 285. Accordingly, the perception data 286 and interaction data 288 can be monitored by the content monitor 220 over the one or more networks 260, and can also be quantified by the content monitor 220. For example, the content monitor 220 can determine an overall time that certain advertising content was displayed to the user (e.g., either on the rider device 285, the vehicle display system 290, or both). Additionally or alternatively, the content monitor 220 can determine a level of interaction with the advertising content (e.g., a number of clicks or selections on ads, video advertisements selectively viewed, etc.).

According to various implementations, the ride experience personalization system 200 can include a ride discount calculator 210, which can receive an ad consumption report 222 from the content monitor 220. The ad consumption report 222 can be based on the perception data 286 and the interaction data 288, and can indicate the level of interaction with the personalized content 232 (e.g., targeted advertising content) by the rider 174. In one example, the ad consumption report 222 can include only ad consumption data by the rider 174 corresponding to a single trip in which the rider 174 utilizes the on-demand transportation service. In this example, the ride discount calculator 210 can calculate a value of the consumed content based on the ad consumption report 222, and provide a discount 212 to the rider account 248 of the rider 174 based on the calculated value.

In variations, the ride discount calculator 210 can receive ad consumption reports 222 from the content monitor 220 that indicate a general total level of ad consumption by the rider 174 (e.g., whenever the rider application 175 is executing on the rider device 285). The ride discount calculator 210 can calculate a total value of the overall ad consumption by the rider 174, and provide a discount 212 to the rider account 248 of the rider 174 for any future on-demand trips based on the valuation of the consumed ads. According to examples, the ride discount calculator 210 can calculate value of ad consumption reports 222 in accordance with known valuation parameters. Furthermore, the ride experience personalization system 200 can provide and monitor usage of personalized content 232 for every user 174 of the on-demand transport service in a given region.

Rider Device

Figure 3:
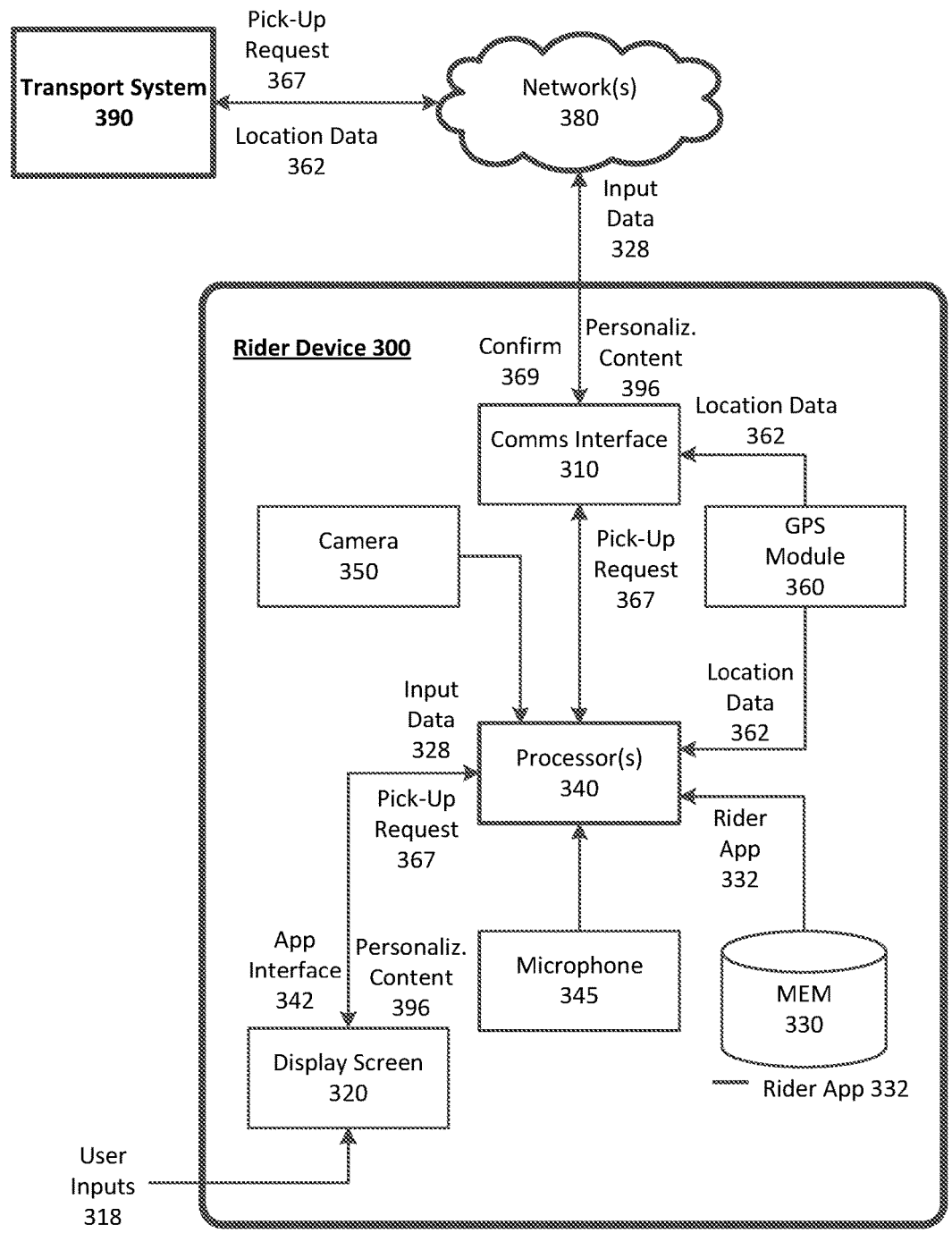
FIG. 3 is a block diagram illustrating an example rider device in communication with a transport system, as described herein.

FIG. 3 is a block diagram illustrating an example rider device executing a designated rider application for a transport arrangement service, as described herein. In many implementations, the rider device 300 can comprise a mobile computing device, such as a smartphone, tablet computer, laptop computer, VR or AR headset device, and the like. As such, the rider device 300 can include typical telephony features such as a microphone 345, a camera 350, and a communication interface 310 to communicate with external entities using any type of wireless communication protocol. In certain aspects, the rider device 300 can store a designated application (e.g., a rider app 332) in a local memory 330.

In response to a user input 318, the rider app 332 can be executed by one or more processors 340, which can cause an app interface 342 to be generated on a display screen 320 of the rider device 300. The app interface 342 can enable the user to, for example, check current price levels and availability for various ride service types of the on-demand transportation arrangement service. In various implementations, the app interface 342 can further enable the user to view information corresponding to the multiple ride service types, and select from the multiple ride service types, such as a carpooling service type, a regular ride-sharing service type, a professional ride service type, a van transport service type, a luxurious ride service type, a self-driving vehicle service type, and the like. Example services that may be browsed and requested can comprise those services provided by UBER Technologies, Inc. of San Francisco, Calif.

The user can generate a pick-up request 367 via user inputs 318 provided on the app interface 342. According to examples described herein, the user can provide user inputs 318 on the app interface 342, which can be processed by the processor(s) 340 and/or the transport system 390 over the network(s) 380 to provide personalized content 396. In doing so, the rider application 332 can enable a communication link with a transport system 390 over the network 380, such as the transport system 100 as shown and described with respect to FIG. 1. To request transportation, the user can input a destination and/or pick-up location, select a ride service type, configure the ride, and/or make one or more specialized requests. Furthermore, the app interface 342 can provide upfront information about each available ride service type, such as an estimated time of arrival at the pick-up location or destination, or an upfront cost for the ride Once the ride service type is selected and the user wishes to request a ride, the processor(s) 340 can transmit the pick-up request 367 via the communications interface 310 to the backend transport facilitation system 390 over a network 380. In response, the rider device 300 can receive a confirmation 369 from the transport facilitation system 390 indicating the selected driver and vehicle that will service the pick-up request 367 and rendezvous with the user at the pick-up location. In various examples, the rider device 300 can further include a GPS module 360, which can provide location data 362 indicating the current location of the requesting user to the transport system 390 to, for example, establish the pick-up location and/or select an optimal driver or autonomous vehicle to service the pick-up request 367.

According to examples described herein, the transport system 390 can provide personalized content 396 to the rider device 300 over the network 380. The personalized content 396 can comprise the content items 198 or personalized content 232 as shown and described with respect to FIGS. 1 and 2 respectively. In some aspects, the rider device 300 can transmit input data 328—corresponding to the user inputs 318 on the app interface 342—to the transport facilitation system 390 that indicates a level of interaction by the rider with the personalized content 396. The input data 328 can be processed by the transport facilitation system 390 (e.g., the personalization engine 120 of FIG. 1, or the ride discount calculator 210 of FIG. 2) to determine a value of the overall consumption of the personalized content 396 by the rider (e.g., to discount an individual ride).

As provided herein, one or more processes described in connection with the transport system 100 of FIG. 1 can be performed by the processor(s) 340 of the rider device 300 executing the rider application 332. For example, certain content updates for the app interface 342 can be generated by the processor(s) 340 as opposed to the content engine 250 as shown and described with respect to FIG. 1. Accordingly, the content updates corresponding to certain rider application 332 screens and interface can be generated by the processor(s) 340 of the rider device 300 via execution of the rider application 332 or through backend processes by the transport facilitation system 100 implementing the ride experience personalization system 200.

Methodology

Figure 4:
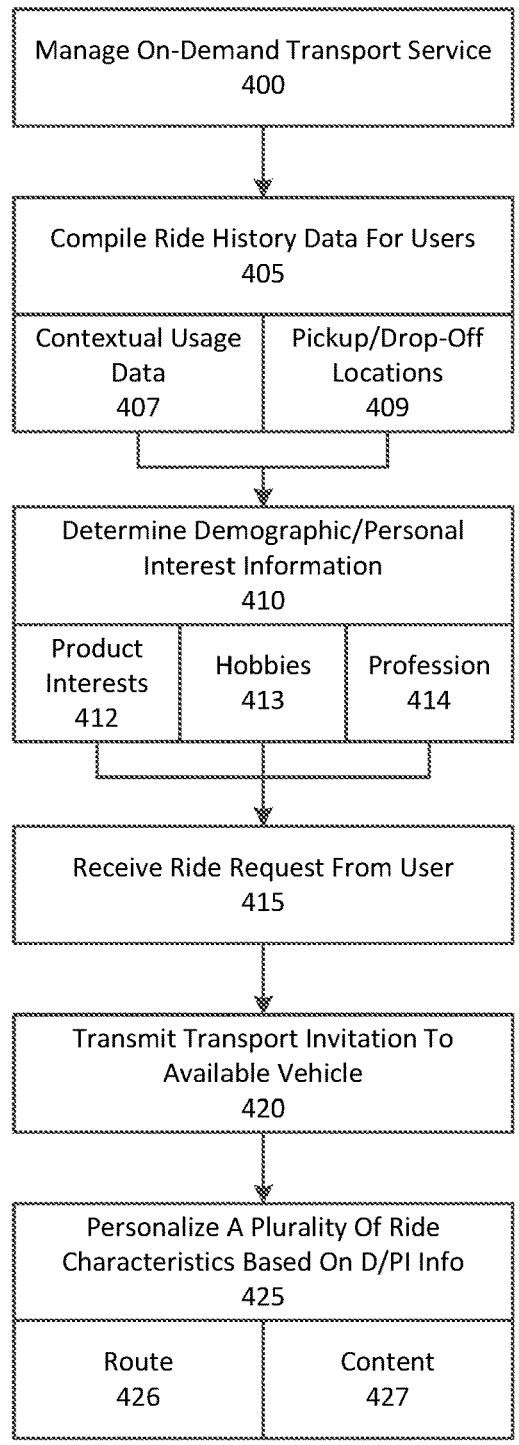
FIG. 4 is a flow chart describing an example method of personalizing ride experience based on contextual ride usage data, according to examples described herein.

FIG. 4 is a flow chart describing an example method of personalizing ride experience based on contextual ride usage data, according to examples described herein. In the below description of FIG. 4, reference may be made to reference characters representing like features as shown and described with respect to FIGS. 1 through 3. Furthermore, the method described in connection with FIG. 4 may be performed by an example transport system 100 implementing a ride experience personalization system 200 as shown and described with respect to FIGS. 1 and 2. Referring to FIG. 4, the transport system 100 can manage an on-demand transportation service that connects requesting users 174 with available drivers 184 and/or SDVs 194 (400). Over time, the transport system 100 can compile ride history data 143 for the requesting users 174 (405). The ride history data 143 can comprise contextual usage data corresponding to the user's usage of the on-demand transportation service (407). In some examples, the contextual usage data can comprise time of day and day of week usage of the transportation service. The contextual usage data can further include the types of ride services requested by the user 174, any specialized requests made by the user 174 (e.g., a baby seat), route detour requests, feedback data 177 corresponding to user ratings of the ride experience, and the like. The contextual usage data can further comprise pickup and drop-off locations of the user 174 (409), which can indicate certain interests, demographics, and behavior patterns of the user 174.

In various examples, the transport system 100 can determine demographic and personal interest information 146 of the user 174 (410). In some aspects, this information 146 can include the user's product interests (412), hobbies (413), and profession (414). For example, morning weekday drop-off locations can provide indicators of the user's profession, whereas weekend drop-off locations may indicate the user's interests or hobbies. The transport system 100 can receive ride requests or pick-up requests 171 from the users 174 (415). In response, the transport system 100 can select a most optimal driver or SDV to service the request 171, and transmit a transport invitation 132 to the selected available vehicle to service the request 171 (420). Thereafter, the transport system 100 can generally personalize one or more ride characteristics based on the determined demographics and personal interest information 146 as determined from the user's ride history (425). For example, the transport system 100 can transmit personalized route data 133 to the selected vehicle to personalize the route for the user 174 (426). Additionally or alternatively, the transport system 100 can provide personalized content 232 to the rider 174 (e.g., via the rider's computing device 170 or the vehicle display system 290 of the selected vehicle) (427).

Figure 5:
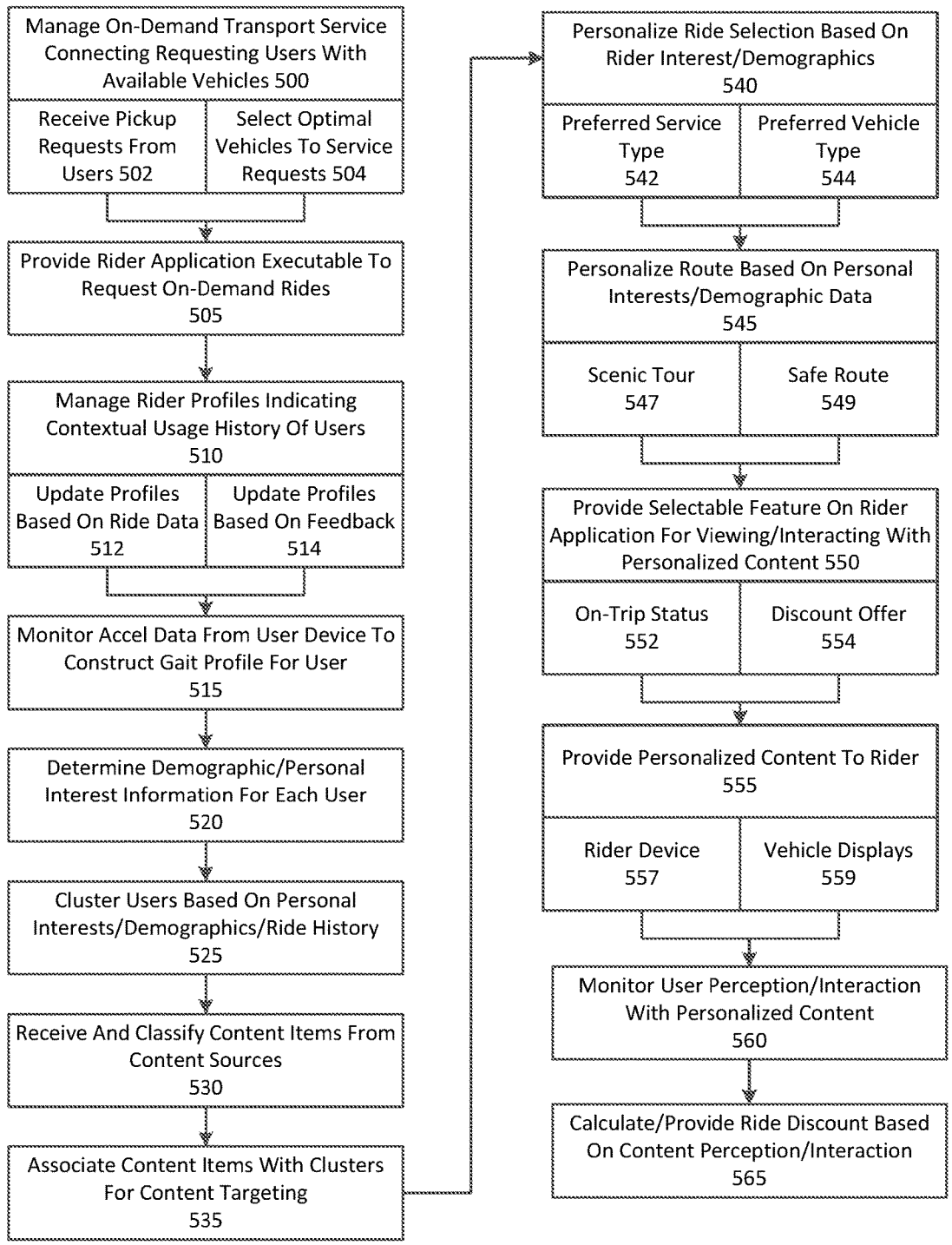
FIG. 5 is a lower level flow chart describing an example method of personalizing ride experience based on contextual ride usage data, according to examples described herein.

FIG. 5 is a lower level flow chart describing an example method of personalizing ride experience based on contextual ride usage data, according to examples described herein. In the below description of FIG. 5, reference may also be made to reference characters representing like features as shown and described with respect to FIGS. 1 through 3. Furthermore, the method described in connection with FIG. 5 may be performed by the transport system 100 implementing the ride experience personalization engine 200 as shown and described with respect to FIGS. 1 and 2. Referring to FIG. 5, as described herein, the transport system 100 can manage an on-demand transportation service that connects requesting users 174 with available drivers 184 and/or SDV 194 (500). In doing so, the transport system 100 can receive pick-up requests 171 from the requesting users 174 (502), and select optimal vehicles (either human driven or autonomous) to service the pick-up requests 171 (504).

In certain implementations, the transport system 100 can implement the on-demand transportation platform by providing a rider application 175 to the users 174, where the rider application 175 is executable on the rider's computing device to enable the user 174 to request on-demand rides (505). The transport system 100 may also manage rider profiles 142 comprising ride history data 143 indicating the contextual usage of the on-demand transportation service by each individual user (510). For example, the profile manager 150 of the transport system 100 can update the rider profiles 142 based on ride data 131 for each ride consumed by the user 174 (512). The ride data 131 can indicate any details of an individual ride, such as the time and date of pick-up and drop-off, the pick-up and drop-off locations, and the requested ride service type. In certain implementations, the profile manager 150 can further update the rider profiles 142 based on feedback data 177 provided to the transport system 100 (e.g., ratings data for any particular ride).

In some examples, the transport system 100 can determine certain characteristics of the user 174 based on accelerometer data from an accelerometer or an inertial measurement unit (IMU) of the user's computing device 170. For example, estimates of the user's height and weight may be determined from accelerometer data of the user's computing device 170. Additionally, any injuries or physical disabilities may also be determined based on the accelerometer data. According to some examples, the transport system 100 can monitor accelerometer data from the user device 170 of the user 174 to construct a gait profile for the user 174 (515). For example, execution of the rider application 175 by the rider device 170 can provide network access to the IMU or accelerometer of the rider device 170 to monitor and analyze the accelerometer data. The gait profile can be analyzed by the transport system 100 to determine certain user characteristics, such as height and weight. Along these lines, certain demographic information may also be extrapolated from the gait profile of the user 174.

Accordingly, the transport system 100 can determine demographic and personal interest information 146 for each user 174 of the transportation service (520). As provided herein, this information 146 can be determined by the transport system 100 by analyzing the ride history data 143 of the user 174. As mentioned above, the demographic and personal interest data 146 can also be determined from the gait profile of the user 174, and/or third party data from third party sources (e.g., indicating the user's content browsing history, social media activity, and the like). In some aspects, the transport system 100 can cluster the users 174 based on the personal interests and demographic data 146 as determined, at least in part, by the ride history of the users 174 (525).

In some implementations, the transport system 100 can receive and classify content items 198 from any number of content sources 195 (530). The transport system 100 can associate the content items 198 with the clusters for content targeting (535). As described herein, some or all of the content items 198 can comprise advertising content from partnered advertisers or advertising suppliers or intermediaries.

In certain aspects, receiving the pick-up request 171 can trigger the transport system 100 to perform lookups 251 for personalized content 232 to provide to the user 174. In variations, each time the rider application 175 is executed on the rider device 170, the transport system 100 can provide personalized content 232 to the rider device 170. As such the timing and triggers of providing the personalized content 232 to the rider device 170 can vary.

In one aspect, the transport system 100 can personalize the ride selection based on the rider's personal interest and demographic data 146 (540). For example, in response to receiving the pick-up request 171 from a requesting user 174, the transport system 100 can determine a preferred ride service type for the user 174 and automatically select the preferred service type for the user 174 (542). In further examples, the transport system 100 can determine a preferred vehicle type (e.g., a compact, midsize, or full size car, minivan, van, SUV, electric vehicle, hybrid vehicle, luxury vehicle, self-driving vehicle, specific vehicle brands and models, newer vehicles versus older vehicles, and the like), and can automatically select a preferred vehicle type for the requesting user 174 (544). Such determinations of ride service type or vehicle type may be based on the compiled ride data 131 for the user 174, or certain characteristics of the user 174, such as determinations of whether the user 174 is a parent, a male, female, elderly, young, affluent, disabled, fashionable, apathetic, oblivious, etc.

In certain aspects, the transport system 100 can further personalize the route based on the personal interests and demographics data 146 of the user 174 (545). For example, the ride history data 143 can indicate that the user 174 prefers certain routes, such as more scenic routes, or routes that are less risky (e.g., avoiding congested inner cities or dangerous highways). Accordingly, in some aspects, the transport system 100 can automatically select a more scenic route for the user 174, and transmit the route data to the driver device 180 of the selected driver 184, or to a communication interface of a selected SDV 194 (547). Additionally or alternatively, the transport system 100 can select a less risky route or safest route option among a plurality of route options, and transmit route data to the selected vehicle accordingly (549).

Accordingly to various examples, the transport system 100 can further provide a selectable feature on the user interface 152 of the rider application 175 that enables the user 174 to selectively view or interact with personalized content 232 (550). In one example, the selectable feature can indicate and offer that viewing and/or interacting with the personalized content 232 can result in a discounted ride (554). In variations, the selectable feature can be provided on one or more display screens of the selected vehicle upon rendezvousing with the user 174. In certain implementations, the selectable feature can be displayed to the user 174 (either via the rider device 175 or display system of the vehicle) based on the rider 174 have an on-trip status (552).

In various aspects, the transport system 100 can provide the personalized content 232 to the rider 174 (555). As described herein, the personalized content 232 can be displayed on a display screen of the rider device 170 (557), or the vehicle display system 290 of the selected vehicle (559). In some examples, the transport system 100 can also monitor user perception and/or interaction data 286, 288 corresponding to the user's viewing and/or interaction with the personalized content 232 (560). Based on the perception and/or interaction data 286, 288, the transport system 100 may then calculate an overall value of the rider's consumption of the personalized content 232 (e.g., targeted advertising content), and provide a discount for the ride based on the calculated value (565).

Hardware Diagram

Figure 6:
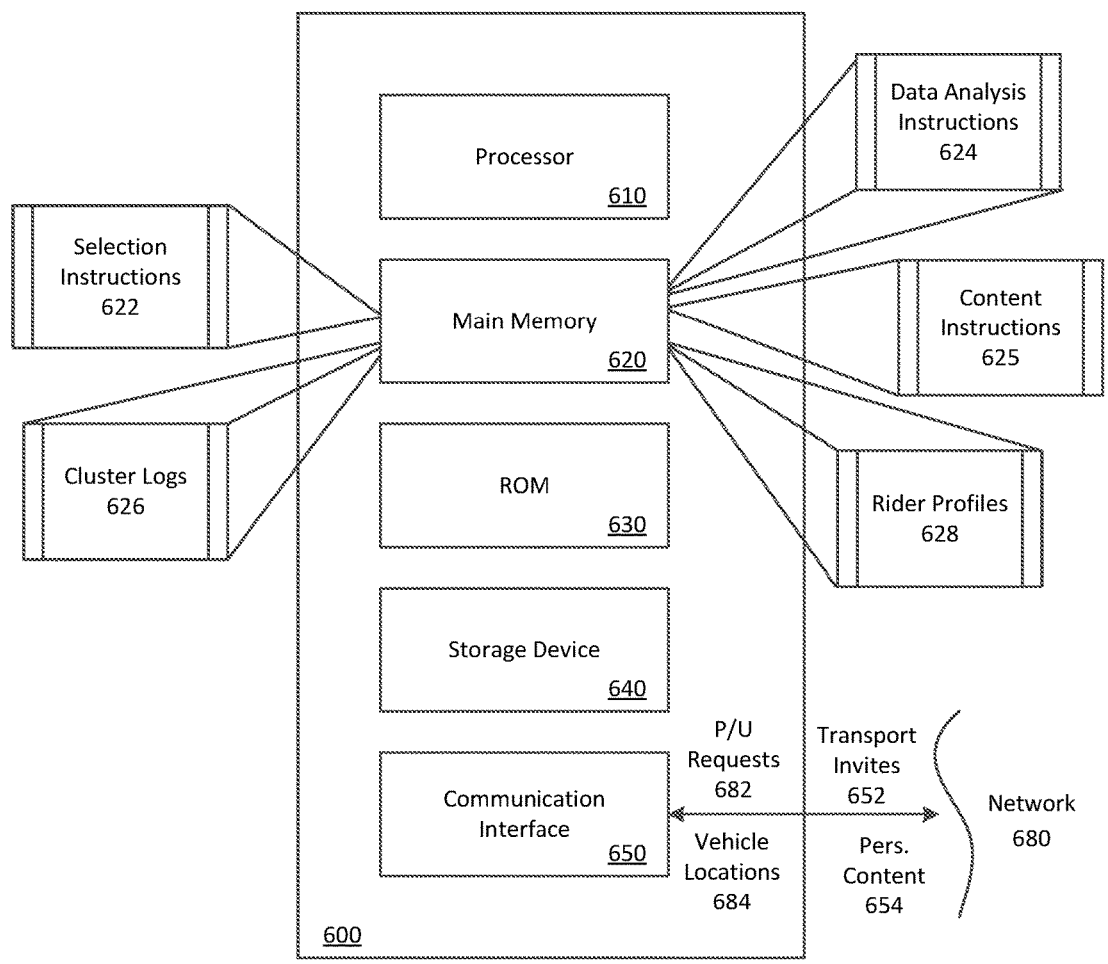
FIG. 6 is a block diagram illustrating a computer system for a backend datacenter upon which example transport systems described herein may be implemented.

FIG. 6 is a block diagram that illustrates a computer system upon which examples described herein may be implemented. A computer system 600 can be implemented on, for example, a server or combination of servers. For example, the computer system 600 may be implemented as part of a network service for providing transportation services. In the context of FIGS. 1 and 2, the transport system 100 and ride personalization system 200 may be implemented using a computer system 600 such as described by FIG. 6. The transport system 100 and ride personalization system 200 may also be implemented using a combination of multiple computer systems as described in connection with FIG. 6.

In one implementation, the computer system 600 includes processing resources 610, a main memory 620, a read-only memory (ROM) 630, a storage device 640, and a communication interface 650. The computer system 600 includes at least one processor 610 for processing information stored in the main memory 620, such as provided by a random access memory (RAM) or other dynamic storage device, for storing information and instructions which are executable by the processor 610. The main memory 620 also may be used for storing temporary variables or other intermediate information during execution of instructions to be executed by the processor 610. The computer system 600 may also include the ROM 630 or other static storage device for storing static information and instructions for the processor 610. A storage device 640, such as a magnetic disk or optical disk, is provided for storing information and instructions.

The communication interface 650 enables the computer system 600 to communicate with one or more networks 680 (e.g., cellular network) through use of the network link (wireless or wired). Using the network link, the computer system 600 can communicate with one or more computing devices, one or more servers, and/or one or more self-driving vehicles. In accordance with examples, the computer system 600 receives pick-up requests 682 from mobile computing devices of individual users. The executable instructions stored in the memory 630 can include selection instructions 622, which the processor 610 executes to select an optimal driver or SDV to service the pick-up request 682. In doing so, the computer system can receive vehicle locations 684 of drivers and SDVs operating throughout the given region, and the processor can execute the selection instructions 622 to select an optimal driver or SDV from a set of available vehicles, and transmit a transport invitation 652 to enable the driver to accept or decline the ride service offer, or to instruct the matched SDV to rendezvous with the requesting user.

The executable instructions stored in the memory 620 can also include data analysis instructions 624, which enable the computer system 600 to analyze the ride history data of each user to determine the demographics and/or personal interests of the user. For example, the computer system 600 can compile ride history data in stored rider profiles 628 of the user, which the computer system 600 can analyze via execution of the data analysis instructions 624 or a machine learning model to determine the demographics and/or personal interests of the user. Accordingly, execution of the data analysis instructions 624 can further cause the processors 610 to cluster the users in cluster logs 626 that can classify the user based on interests, demographics, preferences, or any other clustering metric for content personalization. The executable instructions can further include content instructions 625, which, when executed by the processor 610, cause the computer system 600 to provide personalized content 654 to the user over the network 680.

By way of example, the instructions and data stored in the memory 620 can be executed by the processor 610 to implement an example transport system 100 of FIG. 1 and/or the ride personalization system 200 of FIG. 2. In performing the operations, the processor 610 can receive pick-up requests 682 and driver locations 684, and submit transport invitations 652 to facilitate the servicing of the requests 682. Furthermore, the processor 610 can determine the demographics and interests of the user in order to provide personalized content 654, such as targeted advertising content, to the user (e.g., via the display screen of the user device or a display system of the matched vehicle).

The processor 610 is configured with software and/or other logic to perform one or more processes, steps and other functions described with implementations, such as described with respect to FIGS. 1-5, and elsewhere in the present application. Examples described herein are related to the use of the computer system 600 for implementing the techniques described herein. According to one example, those techniques are performed by the computer system 600 in response to the processor 610 executing one or more sequences of one or more instructions contained in the main memory 620. Such instructions may be read into the main memory 620 from another machine-readable medium, such as the storage device 640. Execution of the sequences of instructions contained in the main memory 620 causes the processor 610 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mention of the particular feature. Thus, the absence of describing combinations should not preclude claiming rights to such combinations.

What is claimed is:

1. A transport system comprising:
a communications interface;
one or more processors; and
one or more memory resources storing instructions that, when executed by the one or more processors, cause the one or more processors to:
compile ride history data for each respective user of an on-demand transportation service, the ride history data comprising contextual usage of the on-demand transportation service by the respective user;
based on the ride history data, determine demographic and personal interest information of the respective user;
receive, via the communications interface over one or more networks, a pick-up request from the respective user;
transmit, using the communications interface, a transport invitation to an available vehicle to provide a current ride for the respective user to service the pick-up request;
personalize one or more ride characteristics of the current ride based on the demographic and personal interest information of the respective user, the personalization of one or more ride characteristics comprises transmitting personalized content to the available vehicle for display on a display screen of the available vehicle;
receive, via the communications interface over one or more networks and after a current ride begins, information indicative of an amount of the personalized content displayed during the current ride; and
provide a discount for the current ride to an account associated with the respective user based, at least in part, on the amount of the personalized content displayed during the current ride.

2. The transport system of claim 1, wherein the executed instructions further cause the one or more processors to:
provide a selectable feature on the at least one of a display screen of the available vehicle or a display screen of the user device, the selectable feature enabling the respective user to select from (i) viewing the personalized content to discount the ride, or (ii) provide the ride with no personalized content.

3. The transport system of claim 1, wherein the information indicative of the amount of the personalized content displayed during the current ride includes
information indicative of at least one of a consumption of or an interaction with the personalized content during the current ride;
wherein the executed instruction cause the one or more processors to further discount the ride based on the monitored level of consumption of or interaction with the personalized content.

4. The transport system of claim 3, wherein the information indicative of the amount of the personalized content displayed during the current ride is based at least in part on one or more of perception data or interaction data associated with the respective user.

5. The transport system of claim 4, wherein the perception data is generated from a content monitor.

6. The transport system of claim 1, wherein the executed instructions further cause the one or more processors to:
identify a pick-up location and a destination from the pick-up request;
wherein the executed instructions cause the one or more processors to personalize the one or more ride characteristics by personalizing a route between the pick-up location and the destination.

7. The transport system of claim 1, wherein the ride history data indicates drop-off locations of the respective user, and wherein the executed instructions cause the one or more processors determine the demographic and personal interest information of the respective user based, at least in part, on the drop-off locations.

8. The transport system of claim 1, wherein the instructions comprise a machine learning model that, when executed, causes the one or more processors to determine the demographic information of the respective user based, at least in part, on the contextual usage of the on-demand transport service by the respective user.

9. The transport system of claim 8, wherein the demographic information comprises at least an estimated age and sex of the respective user.

10. The transport system of claim 8, wherein the pick-up request is received from a user device executing a rider application specific to the on-demand transportation service managed by the transport system, and wherein the executed machine learning model further causes the one or more processors to:
monitor accelerometer data received over the one or more networks from the user device; and
based on the accelerometer data, construct a gait profile corresponding to walking characteristics of the respective user;
wherein the executed machine learning model causes the one or more processors to further determine the demographic information of the respective user based on the constructed gait profile.

11. The transport system of claim 8, wherein the executed machine learning model further causes the one or more processors to:
analyze the ride history data for the users of the on-demand transportation service in order to cluster the users of the on-demand transportation service based on at least one of common demographics or common personal interests; and
for each specified cluster, establish a set of parameters that provides each user in the specified cluster with ride experience characteristics specific to the specified cluster.

12. The transport system of claim 11, wherein the set of parameters specify content to be displayed to users in the specified cluster.

13. The transport system of claim 11, wherein the set of parameters specify one or more vehicle types to be selected for the users in the specified cluster.

14. The transport system of claim 13, wherein the one or more vehicle types comprise at least one of a standard vehicle, a luxury vehicle, a high capacity vehicle, a sport utility vehicle, a specific vehicle brand, or a self-driving vehicle.

15. The transport system of claim 11, wherein the set of parameters specify one or more ride service types to be selected for the users in the specified cluster.

16. The transport system of claim 15, wherein the one or more ride service types comprise one or more of a carpooling service, a standard ride-sharing service, a professional driver service, a black car service, a luxury ride service, a high capacity vehicle service, or a self-driving vehicle service.

17. The transport system of claim 11, wherein the executed machine learning model further causes the one or more processors to:
classify the respective user into one or more clusters;
wherein the executed machine learning model causes the one or more processors to personalize the one or more ride characteristics of the ride based on the classification of the respective user in each of the one or more clusters.

18. The transport system of claim 11, wherein the executed machine learning model clusters the users, based on at least one of common demographics or common personal interests, by representing each of the users as a vector comprising a series of values indicative of each cluster in which the user is classified.

19. A computer-implemented method of personalizing ride experience, the method being performed by one or more processors and comprising:
compiling ride history data for each respective user of an on-demand transportation service, the ride history data comprising contextual usage of the on-demand transportation service by the respective user;
based on the ride history data, determining demographic and personal interest information of the respective user;
receiving, via the communications interface over one or more networks, a pick-up request from the respective user;
transmitting, using the communications interface, a transport invitation to an available vehicle to provide a current ride for the respective user to service the pick-up request;
personalizing one or more ride characteristics of the current ride based on the demographic and personal interest information of the respective user, the personalization of one or more ride characteristics comprises transmitting personalized content to the available vehicle for display on a display screen of the available vehicle;
receiving, via the communications interface over one or more networks and after a current ride begins, information indicative of an amount of the personalized content displayed during the current ride; and
providing a discount for the current ride to an account associated with the respective user based, at least in part, on the amount of the personalized content displayed during the current ride.

20. A non-transitory computer readable medium storing instructions that, when executed by one or more processors, cause the one or more processors to:
compile ride history data for each respective user of an on-demand transportation service, the ride history data comprising contextual usage of the on-demand transportation service by the respective user;
based on the ride history data, determine demographic and personal interest information of the respective user;
receive, via the communications interface over one or more networks, a pick-up request from the respective user;
transmit, using the communications interface, a transport invitation to an available vehicle to provide a current ride for the respective user to service the pick-up request;
personalize one or more ride characteristics of the current ride based on the demographic and personal interest information of the respective user, the personalization of one or more ride characteristics comprises transmitting personalized content to the available vehicle for display on a display screen of the available vehicle;
receive, via the communications interface over one or more networks and after a current ride begins, information indicative of an amount of the personalized content displayed during the current ride; and
provide a discount for the current ride to an account associated with the respective user based, at least in part, on the amount of the personalized content displayed during the current ride.

* * * * *